(12) United States Patent
Bristow

(10) Patent No.: US 6,572,108 B1
(45) Date of Patent: Jun. 3, 2003

(54) GAME PAD CONTROLLER

(75) Inventor: Steve Bristow, Los Altos Hills, CA (US)

(73) Assignee: Radica China Ltd, Tortola (VI)

( * ) Notice: Subject to any disclaimer, the term of this patent is extended or adjusted under 35 U.S.C. 154(b) by 12 days.

(21) Appl. No.: 10/059,783

(22) Filed: Jan. 30, 2002

(51) Int. Cl.[7] .............................................. A63F 13/02
(52) U.S. Cl. ...................... 273/148 B; 463/36; 463/47
(58) Field of Search ....................... 273/148 B; 463/36, 463/37, 47; D21/333, 324, 325, 332

(56) References Cited

U.S. PATENT DOCUMENTS

| | | | |
|---|---|---|---|
| 4,613,139 A | * 9/1986 | Robinson, II | 463/37 |
| 4,720,789 A | 1/1988 | Hector et al. | |
| 4,817,950 A | * 4/1989 | Goo | 463/36 |
| 5,076,584 A | 12/1991 | Openiano | |
| 5,139,261 A | 8/1992 | Openiano | |
| 5,488,362 A | * 1/1996 | Ullman et al. | 341/20 |
| 5,584,779 A | 12/1996 | Knecht et al. | |
| 5,667,459 A | 9/1997 | Su | |
| 5,764,164 A | * 6/1998 | Cartabiano et al. | 341/22 |
| 5,796,354 A | * 8/1998 | Cartabiano et al. | 341/22 |
| 5,812,118 A | * 9/1998 | Shieh | 345/173 |
| 6,001,013 A | 12/1999 | Ota | |
| 6,039,658 A | 3/2000 | Cecchin | |
| 6,110,073 A | * 8/2000 | Saur et al. | 482/8 |
| 6,116,908 A | 9/2000 | Takai | |
| 6,141,643 A | * 10/2000 | Harmon | 704/271 |
| 6,177,623 B1 | 1/2001 | Ooseki | |
| 6,227,968 B1 | 5/2001 | Suzuki et al. | |
| 6,319,130 B1 | 11/2001 | Ooseki et al. | |
| 6,320,110 B1 | 11/2001 | Ishikawa et al. | |
| 6,329,620 B1 | 12/2001 | Oishi et al. | |
| 6,450,886 B1 | * 9/2002 | Oishi et al. | 463/36 |
| 2001/0014620 A1 | * 8/2001 | Nobe et al. | 463/7 |
| 2001/0016510 A1 | * 8/2001 | Ishikawa et al. | 463/7 |

FOREIGN PATENT DOCUMENTS

| | | | |
|---|---|---|---|
| JP | 3003851 | 5/1989 | |
| JP | 3130520 | 6/1991 | |
| JP | 5-161761 | * 6/1993 | ............ A63F/9/22 |
| JP | 2000037490 | 1/2000 | |
| JP | 2000037491 | 2/2000 | |
| JP | 2000070425 | 3/2000 | |
| JP | 2000207990 | 7/2000 | |
| JP | 2000207991 | 7/2000 | |
| JP | 2000207992 | 7/2000 | |
| JP | 2000293292 | 10/2000 | |
| JP | 2000293294 | 10/2000 | |
| JP | 2000294076 | 10/2000 | |
| JP | 2000325521 | 11/2000 | |
| JP | 2000325665 | 11/2000 | |
| JP | 2000325666 | 11/2000 | |
| JP | 2001000610 | 12/2000 | |
| JP | 2001062144 | 2/2001 | |
| JP | 2001095969 | 4/2001 | |
| JP | 2001096060 | 4/2001 | |
| JP | 2001137415 | 5/2001 | |
| JP | 2001161878 | 6/2001 | |

* cited by examiner

*Primary Examiner*—Raleigh W. Chiu
(74) *Attorney, Agent, or Firm*—Bingham McCutchen, LLP; David G. Beck

(57) ABSTRACT

A game pad controller for use with a dedicated game system, personal computer, or other device is provided. The game pad controller includes a plurality of individual stepping or touch zones. The central axis of each zone is non-parallel with sufficient angle between adjacent zone axes to accommodate users of various sizes.

17 Claims, 3 Drawing Sheets

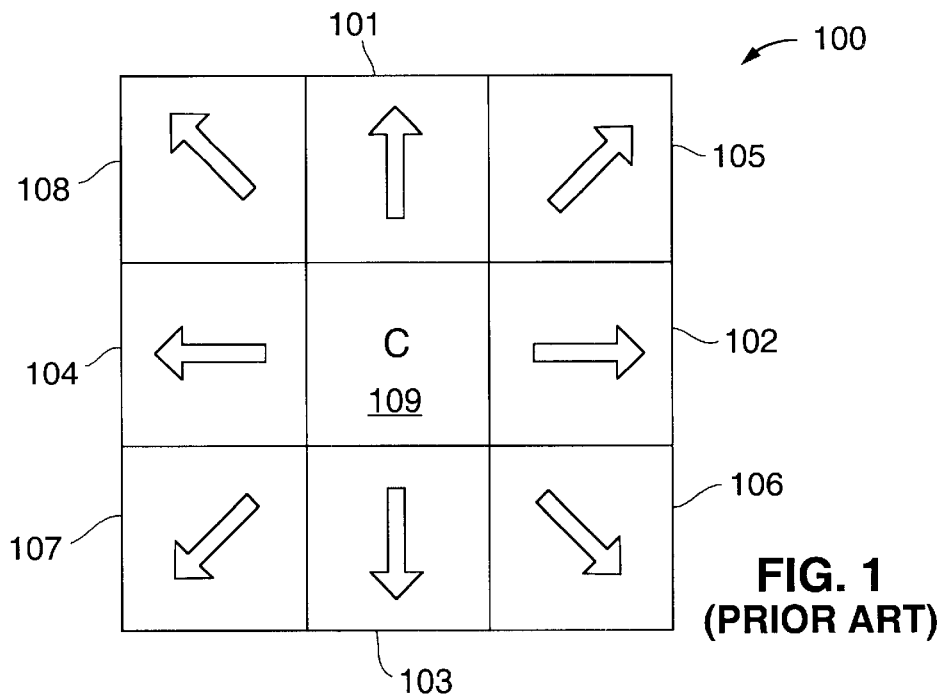
FIG. 1 (PRIOR ART)
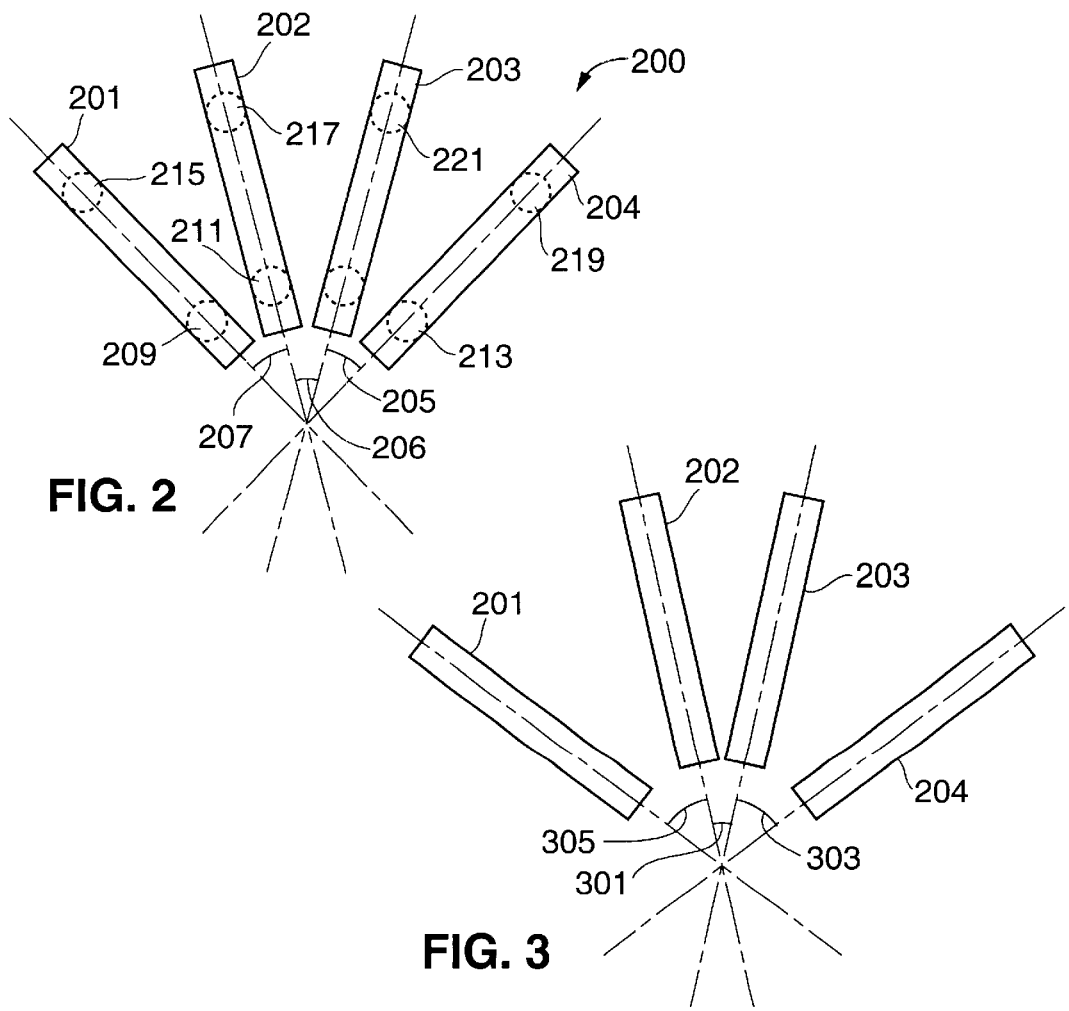
FIG. 2
FIG. 3

GAME PAD CONTROLLER

FIELD OF THE INVENTION

The present invention relates generally to game controllers and, more particularly, to a game pad controller.

BACKGROUND OF THE INVENTION

The use of controllers, and more particularly game controllers, with personal computers or gaming systems is well known. Typical game controllers such as joysticks, steering wheels, throttles, and control pads utilize buttons, slide switches, and/or rotary switches that the user manipulates using their fingers and one or both thumbs. The user may also be required to move the relative position of their hands, for example to simulate steering wheel movement. Additionally, some controllers may include one or more foot-operable switches, for example for use with a car or plane simulator.

Another type of control pad or mat is intended to promote a more physically intense interaction between the user and the game by requiring the user to move their feet following a predetermined pattern and cadence. For example, one pad controller released by Bandai was designed to instigate fitness by directing the user to perform various aerobic exercises (e.g., simulated participation in a variety of track and field events, simulated aerobic workouts, etc.). More recently, pad controllers have been used in a variety of dance games in which the user is instructed, via an attached display, to move their feet in rhythm to prerecorded music following specific dance steps.

Typical pad controllers are comprised of a flexible or non-flexible base (i.e., the pad/mat) that is divided into a plurality of zones. Each zone includes a touch-sensitive switch that allows the controller to recognize when a user is stepping on a specific zone. The zones may also include some form of indicia (e.g., arrows, colors, patterns, etc.) that can be used in conjunction with similar indicia shown on a display to instruct the user both where and when to step. Most pad controllers utilize a three by three zone pattern, thus providing a maximum of nine zones.

Prior game pad controllers have used circularly shaped buttons or rectantularly shaped (i.e., piano keys) zones. In the latter case, the central axes of the rectangularly shaped zones were parallel, thus causing a fixed spacing between zones, the selected zone spacing being targeted for the average anticipated user. Thus a game pad designed for use by toddlers would use a very narrow zone spacing in contrast to a game pad designed for use by teenagers or adults. As a result of using fixed zone spacing, the usefulness of a particular prior game pad controller is limited to the targeted users.

SUMMARY OF THE INVENTION

A game pad or mat controller for use with a dedicated game system, personal computer, or other device is provided. The game pad controller includes a plurality of individual zones, the relative positions of which allow users of varying sizes to comfortably use the controller.

In one aspect of the invention, the game pad controller includes a plurality of zones that define a plurality of stepping zones. Preferably the game pad controller includes four stepping zones. The central axes of the stepping zones are non-parallel. Preferably the angle between adjacent stepping zone axes is sufficient to accommodate users with small feet and a relatively narrow average spread between their feet as well as users with large feet and a relatively large foot spread.

In another aspect of the invention, the game pad controller includes a plurality of zones that define a plurality of finger zones, and preferably, a thumb zone. The central axis of each touch zone is non-parallel with an angle between adjacent touch zone axes sufficient to accommodate users with various sized hands.

In another aspect of the invention, each of the zones of the game pad controller includes a pressure sensitive switch. Alternately, the zones of the game pad controller can utilize non-pressure sensitive switches, for example, ones utilizing light beams and corresponding detectors.

A further understanding of the nature and advantages of the present invention may be realized by reference to the remaining portions of the specification and the drawings.

BRIEF DESCRIPTION OF THE DRAWINGS

FIG. 1 is an illustration of a game pad controller in accordance with the prior art;

FIG. 2 is an illustration of an embodiment of the invention designed for use in a simple step or dance game;

FIG. 3 is an illustration of an alternate embodiment of the invention in which the zone axes are separated by non-equivalent angles;

DESCRIPTION OF THE SPECIFIC EMBODIMENTS

Figure 4:
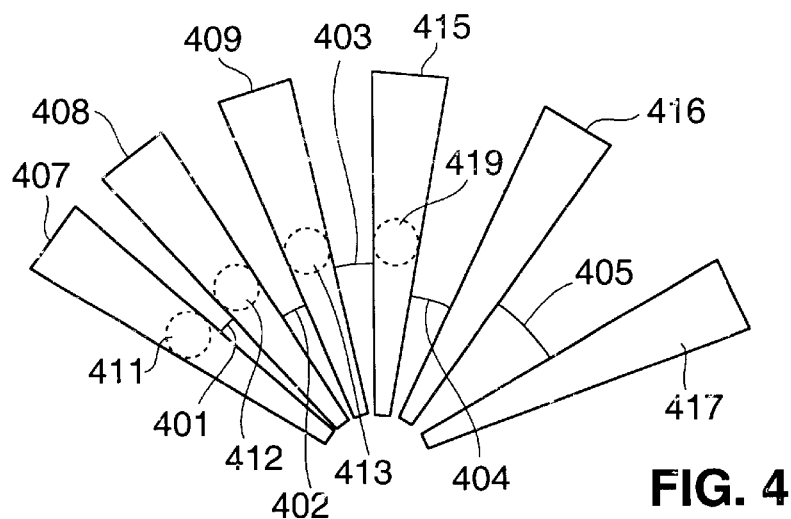
FIG. 4 is an illustration of an alternate embodiment of the invention in which the angles separating the individual zones are progressively larger.

The present invention provides a game pad controller that can be coupled via wired or wireless connections to an electronic device, such as a personal computer, dedicated game system, or other electronic device. Dedicated game systems include NINTENDO game systems (e.g., GAMECUBE, GAMEBOY ADVANCE, GAMEBOY COLOR, NINTENDO 64, Super Nintendo Entertainment System, etc.), Sony game systems (e.g., PlayStation, PlayStation 2, etc.), and others. Note that the words NINTENDO, GAMECUBE, GAMEBOY ADVANCE, GAMEBOY COLOR, NINTENDO 64, Super Nintendo Entertainment System, Sony, PlayStation, and PlayStation 2 may be subject to trademark protection.

FIG. 1 schematically illustrates a game pad controller 100 according to the prior art. Controller 100 is comprised of a three by three pattern of zones; four vertically-and horizontally-positioned zones 101–104, four diagonally-positioned zones 105–108, and a central zone 109. Assuming that the game associated with game pad controller 100 instructs the player to simultaneously step on zone 104 with their left foot and on zone 102 with their right foot, the player must be able to span the distance given by zone 109. Depending upon the size of zones 101–109, and in particular zone 109, this task could prove daunting for a small child who may only be capable of a relatively narrow spread between their feet. Conversely, if zones 101–109, and in particular zone 109, are small enough to comfortably accommodate the small child, a teenager or adult may find that zones 102 and 104 are too close together to comfortably use. The problems can be exacerbated if the game requires rapid foot movement (e.g., dance game, aerobics game, running game, etc.) as the user would then be required to make rapid movements while either stretching (e.g., in the case of a child) or maintaining a stance in which the user's feet are uncomfortably close together (e.g., in the case of an adult). For a child, the problems are further exacerbated if the game instructs the child to step on two diagonally opposed zones (e.g., 105 and 107). For a large teenager or an adult, the problems are further exacerbated if the game instructs the adult to step on two immediately adjacent zones (e.g., 104 and 109).

FIG. 2 schematically illustrates one embodiment of the invention. Game pad controller 200 is comprised of four zones 201–204, although it will be appreciated that both fewer and greater numbers of zones can be used without departing from the invention. The centerline axes of zones 201–204 are offset by angles 205–207. In a preferred embodiment of the invention, angles 205–207 are equivalent although it is understood that the angles separating the zones need not be equivalent. For example, in the embodiment illustrated in FIG. 3, angle 301 separating zones 202 and 203 is smaller than angle 303 separating zones 203 and 204. Angle 301 is also smaller than angle 305 separating zones 201 and 202. Other variations are also anticipated, for example where the angles separating adjacent zones become progressively larger as illustrated in FIG. 4 (i.e., angle 401<402<403<404<405) or where adjacent zone central axes intersect at multiple locations as illustrated in FIG. 5 (i.e., intersection locations 501–503).

Referring to FIG. 2, it will be illustrated how users of varying sizes can use the game pad controller of the invention. Assuming for purposes of this illustration that the game instructs the player to maintain their left foot on zone 201 while moving their right foot from zone 202 to zone 204, a small user would access the zones near the point where the zone axes intersect. Specifically, a small user would place their left foot in the area marked 209 while moving their right foot from the area marked 211 to the area marked 213. Following the same directions and using the same game pad controller, a larger user would access the zones near the distal end of each zone. Accordingly in this same example, the large user would place their left foot in the area marked 215 while moving their right foot from the area marked 217 to the area marked 219. Thus game pad controller 200 is able to accommodate both small and large users without making any controller or software alterations.

Figure 6:
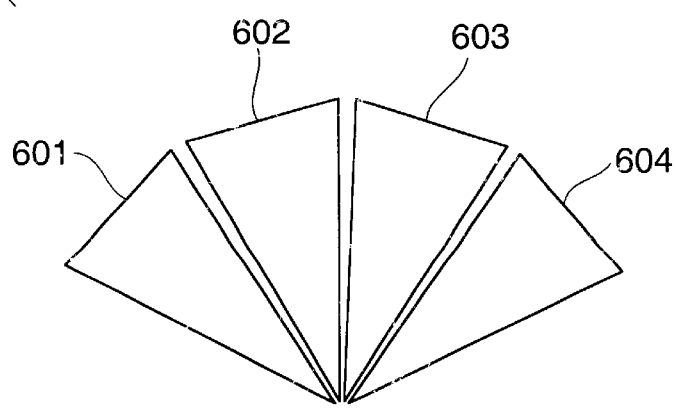
FIG. 6 is an illustration of an alternate embodiment of the invention in which the individual zones are irregularly shaped.

FIG. 6 illustrates another embodiment of the invention in which the individual zones are irregularly shaped. As shown, each zone 601–604 is proximately triangular in shape although it will be understood that the invention is equally applicable to other shapes (e.g., irregular shapes). The benefit of the illustrated irregularly shaped zones in conjunction with the present invention is that as the distance between zone axes increases, the width of the zones increases, thus making it easier for larger users and their proportionally larger feet to be accommodated.

Figure 5:
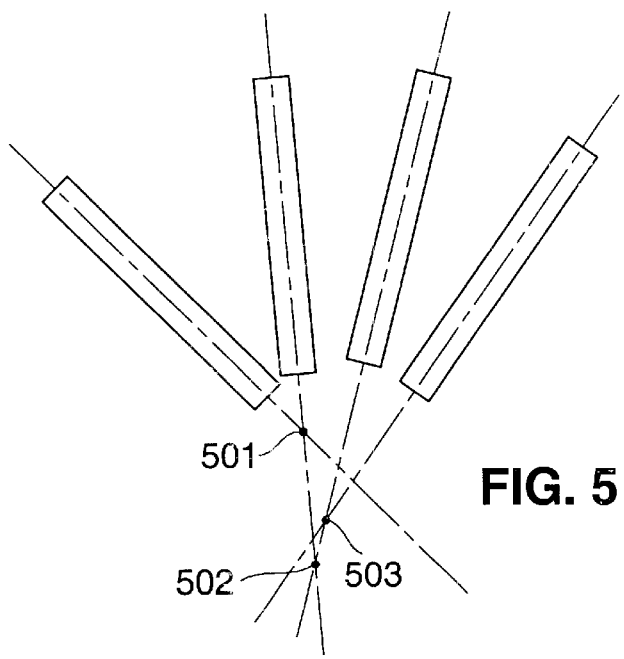
FIG. 5 is an illustration of an alternate embodiment of the invention in which adjacent zone central axes intersect at different locations.

A benefit of progressively varying the angle between adjacent zone axes, as illustrated in FIG. 4, is that it allows the user a means of varying the difficulty of an associated game. For example, in a typical dance game that requires the user to follow a series of dance steps presented on an accompanying display, the game may allow the user to vary difficulty by altering the dance tempo, the dance step complexity, or the number of stepping zones to be used. The present invention allows an additional degree of complexity to be added by varying the required step reach. Thus, as illustrated in FIG. 4, initially the user may only use zones 407–409, alternating between stepping areas 411–413. If the user programs the game for increased difficulty, the user may be required to use some, or all, of additional stepping zones 415–417. Thus, for example, the user may be required to reach between area 411 on zone 407 to area 419 on zone 415.

An additional benefit of the present invention is that it allows the game associated with the game pad controller to require the user to follow relatively complicated steps. For example, the user may be required to simultaneously step on two zones. Assuming an embodiment similar to that shown in FIG. 2 and a relatively large user such that the user would normally step at the distal end of each stepping zone (e.g., areas 215, 217, 219 and 221), requiring the user to simultaneously step on stepping zones 201 and 202 would require the user to simultaneously step on or near areas 209 and 211.

Figure 7:
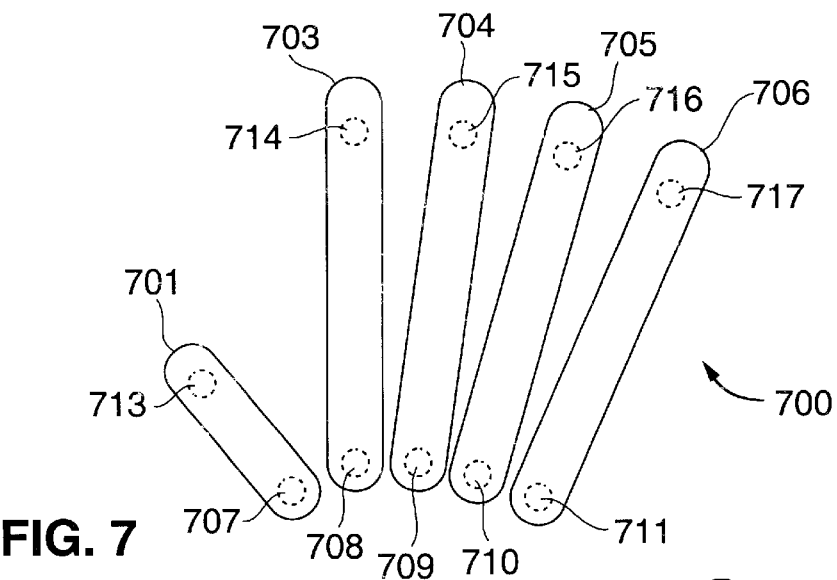
FIG. 7 is an illustration of an embodiment of the invention designed to accommodate hands of varying sizes.

The present invention is not limited to use with stepping zones. For example, FIG. 7 illustrates a game pad controller 700 designed to accommodate hands of varying sizes. As with the previously described controllers, game pad controller 700 can be used as an input device/interface with dedicated gaming systems, personal computers, or other types of electronic devices. As illustrated, controller 700 includes a thumb zone 701 and finger zones 703–706. If the user has relatively small hands (e.g., the hand of a small child), the user accesses the zones near the "palm" area of the controller, i.e., at areas 707–711. Alternately, if the user has relatively large hands (e.g., the hand of an adult), the user accesses the zones near the distal end portions of each zone, i.e., at areas 713–717. As noted above with reference to foot pad game controller 200, finger pad game controller 700 allows the user to easily transition between adjacent zones as well as simultaneously activate multiple zones.

Figure 8:
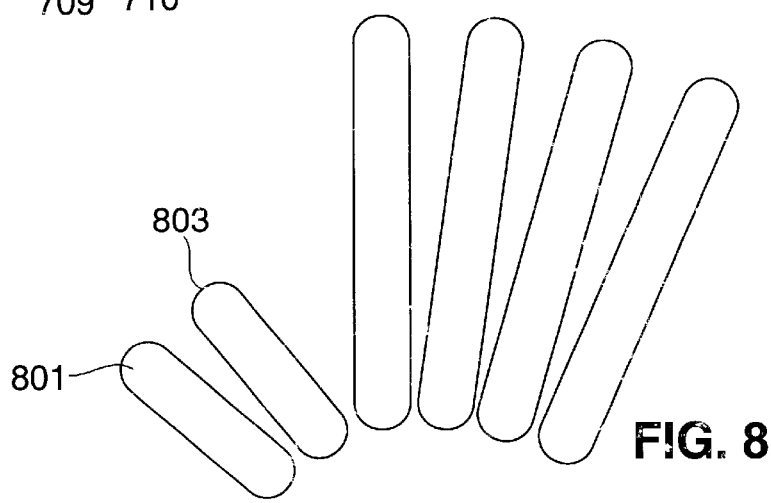
FIG. 8 is an illustration of an alternate hand game pad controller utilizing two thumb zones.

It is understood that a game pad controller, such as that illustrated in FIG. 7, does not require a thumb zone nor does it require finger zones for all four fingers. It is also understood that a game pad controller of the present invention can utilize more than one thumb zone, as illustrated in FIG. 8, thus allowing the user to access either thumb zone 801 or thumb zone 803 by merely increasing or decreasing the angle between the user's thumb and the user's forefinger. Additionally it is understood that the game pad controller of the present invention can utilize more than four finger zones in order to provide additional flexibility. For example, in the game pad controller illustrated in FIG. 9, two thumb zones 901 and 902 are provided as well as six finger zones 903–908. Other combinations are also envisioned.

Figure 9:
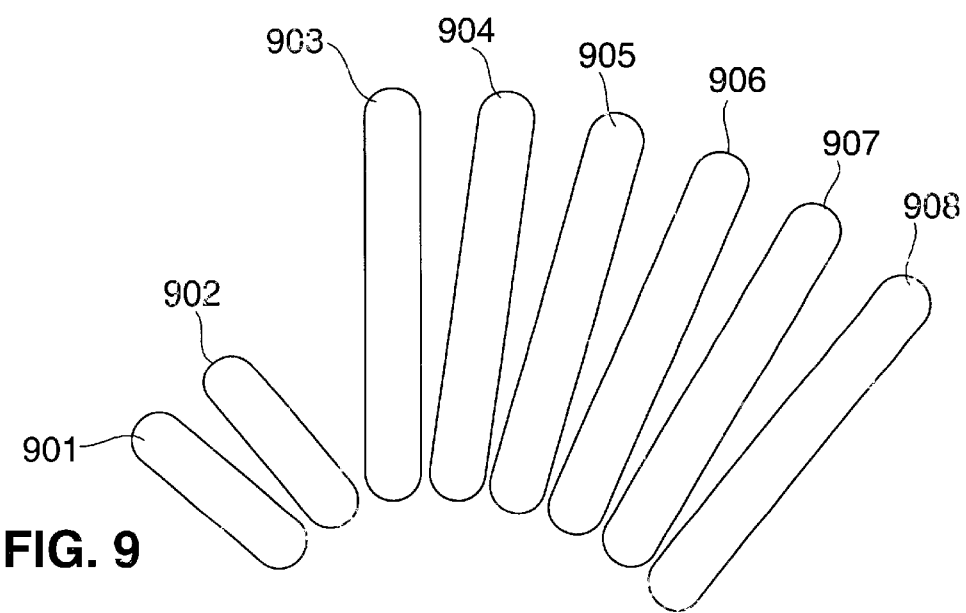
FIG. 9 is an illustration of an alternate hand game pad controller utilizing two thumb zones and six finger zones.

The game pad controllers illustrated in FIGS. 7–9 are designed to accommodate a user's right hand, although it will be appreciated that the controller can also be designed to accommodate a user's left hand. In a preferred embodiment of the invention, the sensors within the sensing zones operate equally well from either side of the game pad, thus allowing a single game pad to be used with either the user's right or left hand by simply reversing the game pad.

The hand and foot game pad controllers described and illustrated above can utilize any of a variety of touch sensing systems. Preferably pressure sensitive switches are used. For example, a pressure sensitive switch can be comprised of two conductive members separated by a perforated, compressible member, the two conductive members making contact when the perforated member is compressed. As pressure sensitive switches are well known in the prior art, further detailed description will not be provided herein. The present invention can also utilize touch sensing systems based on conductive contacts or non-conductive contact capacitive switches. In yet another alternative embodiment, the invention utilizes a touch sensing system in which one or more light beams (i.e., infrared or visible light beams) are positioned over each zone of the game pad controller. When the user touches a zone, the light beam or beams positioned over that zone are interrupted, resulting in a "touch" signal being sent to the controller. It is understood that other touch sensing systems can be utilized without departing from the invention.

As will be understood by those familiar with the art, the present invention may be embodied in other specific forms without departing from the spirit or essential characteristics thereof. For example, all of the zones of the game pad controller can be similarly decorated or each zone can be distinctively decorated, thus allowing the zones to be visually distinguishable. Accordingly, the disclosures and descriptions herein are intended to be illustrative, but not limiting, of the scope of the invention which is set forth in the following claims.

What is claimed is:

1. A game pad controller comprising:
   a plurality of non-parallel, elongated touch zones, wherein a plurality of centerline axes corresponding to said plurality of elongated touch zones are non-parallel;
   a plurality of touch sensors, wherein each of said plurality of touch sensors correspond to each of said plurality of non-parallel, elongated touch zones, wherein a touch sensitive area corresponding to each of said plurality of touch sensors extends over each of said plurality of non-parallel, elongated touch zones, wherein each of said plurality of touch sensors outputs a signal when said touch sensitive area is touched; and
   coupling means to couple said game pad controller to a device.

2. The game pad controller of claim 1, wherein said plurality of non-parallel, elongated touch zones is comprised of at least four non-parallel, elongated touch zones.

3. The game pad controller of claim 1, wherein each of said plurality of centerline axes is comprised of a first end portion and a second end portion, wherein said first end portions intersect at a common point.

4. The game pad controller of claim 1, further comprising a plurality of angles defined by adjacent pairs of said plurality of centerline axes, wherein each of said plurality of angles are equivalent.

5. The game pad controller of claim 1, further comprising a plurality of angles defined by adjacent pairs of said plurality of centerline axes, wherein each of said plurality of angles is progressively larger than the preceding angle.

6. The game pad controller of claim 1, wherein each of said touch sensitive areas are equivalently sized.

7. The game pad controller of claim 1, wherein each of said plurality of non-parallel, elongated touch zones is rectangularly shaped.

8. The game pad controller of claim 1, wherein each of said plurality of non-parallel, elongated touch zones has a first end portion and a second end portion, wherein a first width associated with said first end portion is larger than a second width associated with said second end portion for each of said plurality of non-parallel, elongated touch zones.

9. The game pad controller of claim 1, wherein each of said plurality of non-parallel, elongated touch zones is irregularly shaped.

10. The game pad controller of claim 1, wherein said coupling means is comprised of a wired connector.

11. The game pad controller of claim 1, wherein said coupling means is comprised of a wireless connector.

12. The game pad controller of claim 1, wherein said plurality of non-parallel, elongated touch sensors is comprised of a plurality of pressure sensitive sensors.

13. The game pad controller of claim 1, wherein each of said plurality of non-parallel, elongated touch sensors is comprised of at least one light source and at least one light detector.

14. The game pad controller of claim 1, wherein each of said plurality of non-parallel, elongated touch sensors define a step zone.

15. A game pad controller comprising:
   a plurality of elongated, pressure sensitive zones, wherein each of said plurality of elongated, pressure sensitive zones includes a central axis, wherein said plurality of central axes corresponding to said plurality of elongated, pressure sensitive zones intersect at a central location, wherein each of said plurality of elongated, pressure sensitive zones outputs a signal when a pressure is applied to a surface of said elongated, pressure sensitive zone; and
   a gaming system coupler.

16. The game pad controller of claim 15, wherein said central location is comprised of a single point.

17. The game pad controller of claim 15, wherein said central location is comprised of a plurality of intersection points, wherein each of said intersection points is defined by the intersection of two adjacent central axes.

* * * * *